(12) United States Patent
Oh

(10) Patent No.: US 7,613,732 B2
(45) Date of Patent: Nov. 3, 2009

(54) AUTO ORGANIZATION HIERARCHY TRAVERSAL IN EMAIL ADDRESSEES

(75) Inventor: Haw Kuang Oh, Penang (MY)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 11/128,695

(22) Filed: May 12, 2005

(65) Prior Publication Data

US 2006/0136494 A1      Jun. 22, 2006

(30) Foreign Application Priority Data

Dec. 22, 2004    (MY) .............................. PI 20045304

(51) Int. Cl.
*G06F 17/00* (2006.01)
*G06F 17/30* (2006.01)
*G06F 15/16* (2006.01)

(52) U.S. Cl. ................. 707/104.1; 707/10; 707/103 Y; 709/206; 709/207

(58) Field of Classification Search .................. 707/10, 707/103 Y, 104.1; 709/204, 206, 207
See application file for complete search history.

(56) References Cited

U.S. PATENT DOCUMENTS

| | | | | |
|---|---|---|---|---|
| 5,752,059 | A * | 5/1998 | Holleran et al. .............. | 709/245 |
| 5,822,526 | A * | 10/1998 | Waskiewicz ................ | 709/206 |
| 5,930,479 | A * | 7/1999 | Hall .......................... | 709/238 |
| 5,944,787 | A * | 8/1999 | Zoken ........................ | 709/206 |
| 6,442,591 | B1 * | 8/2002 | Haynes et al. .............. | 709/206 |
| 6,460,074 | B1 * | 10/2002 | Fishkin ...................... | 709/206 |
| 6,609,138 | B1 * | 8/2003 | Merriam ..................... | 707/204 |
| 6,643,687 | B1 * | 11/2003 | Dickie et al. ................ | 709/206 |
| 6,671,718 | B1 * | 12/2003 | Meister et al. .............. | 709/206 |
| 6,721,785 | B1 * | 4/2004 | Raghunandan .............. | 709/206 |
| 6,769,002 | B2 * | 7/2004 | Ayan ........................ | 707/104.1 |
| 6,775,689 | B1 * | 8/2004 | Raghunandan .............. | 709/206 |
| 6,832,244 | B1 * | 12/2004 | Raghunandan .............. | 709/206 |
| 6,895,426 | B1 * | 5/2005 | Cortright et al. ............ | 709/206 |
| 6,993,574 | B2 * | 1/2006 | Hall ........................... | 709/219 |
| 7,120,629 | B1 * | 10/2006 | Seibel et al. ................. | 707/5 |
| 7,133,901 | B1 * | 11/2006 | Dalby et al. ................. | 709/206 |
| 7,237,009 | B1 * | 6/2007 | Fung et al. .................. | 709/206 |
| 7,360,165 | B2 * | 4/2008 | Cortright et al. ............ | 715/752 |

(Continued)

OTHER PUBLICATIONS

Neibauer, Alan, Running Microsoft Outlook 2000, Microsoft Press, Redmond, Wa, © 1999, pp. 72, 120-126, 132-134, 406 and 408.*

(Continued)

*Primary Examiner*—Robert Stevens
(74) *Attorney, Agent, or Firm*—Schwabe, Williamson & Wyatt, P.C.

(57) ABSTRACT

A method for automatic hierarchy traversal in email addressees. The method includes parsing an entry in an email addressee field and determining if the entry includes a predefined notation appended to the entry. If the entry has a predefined notation appended to the entry, then the hierarchy structure for the name in the entry is traversed based on the predefined notation. The predefined notation includes a special character to identify the direction of traversal and a level indicator to identify the level of traversal. Email addresses for each name listed at the designated level of the hierarchy structure are retrieved and the entry in the email addressee field is replaced with the retrieved email addresses.

24 Claims, 9 Drawing Sheets

U.S. PATENT DOCUMENTS

| | | | |
|---|---|---|---|
| 2002/0091773 A1* | 7/2002 | Chowdhry et al. | 709/206 |
| 2002/0165969 A1* | 11/2002 | Gallant | 709/227 |
| 2002/0181466 A1* | 12/2002 | Neustein et al. | 370/393 |
| 2002/0188690 A1* | 12/2002 | Lee | 709/206 |
| 2002/0194308 A1* | 12/2002 | Hall | 709/219 |
| 2003/0050920 A1* | 3/2003 | Sun | 707/2 |
| 2003/0088824 A1* | 5/2003 | Ayan | 715/500 |
| 2003/0191806 A1* | 10/2003 | Osterberg et al. | 709/206 |
| 2003/0225850 A1* | 12/2003 | Teague | 709/207 |
| 2004/0078488 A1* | 4/2004 | Patrick | 709/245 |
| 2004/0103155 A1* | 5/2004 | Perepa et al. | 709/206 |
| 2004/0122835 A1* | 6/2004 | McKibben et al. | 707/100 |
| 2004/0236749 A1* | 11/2004 | Cortright et al. | 707/9 |
| 2005/0015451 A1* | 1/2005 | Sheldon et al. | 709/206 |
| 2005/0114453 A1* | 5/2005 | Hardt | 709/206 |
| 2005/0188043 A1* | 8/2005 | Cortright et al. | 709/206 |

OTHER PUBLICATIONS

Willett, Edward C., et al., Office XP Bible, Hungry Minds, Indianapolis, IN, © 2001, pp. 731-732 and 759-762.*

Anderson, Allan R., "Distribution List Maker Program with Inter-User Capabilities between Universities and Colleges in the Tennessee Board of Regents School System", East Tennessee State University Dept. Of Computer Science Masters Thesis, May 2001, pp. 1-62.*

Whittaker, Steve, et al., "ContactMap: Using Personal Social Networks to Organize Communication in a Social Desktop", ACM, 1073-0516/01/0300-0034, © 2002, pp. 1-30.*

Curtin, Matt, "Shibboleth: Private Mailing List Manager", Proc. of the 9th USENIX Security Symposium, Denver, CO, Aug. 14-17, 2000, pp. 1-14.*

* cited by examiner

AUTO ORGANIZATION HIERARCHY TRAVERSAL IN EMAIL ADDRESSEES

BACKGROUND OF THE INVENTION

1. Field of the Invention

Embodiments of the present invention are generally related to the field of electronic mail (email). More particularly, embodiments of the present invention are related to using an auto organization hierarchy to provide addressee automation of electronic mail.

2. Description

Email users often spend time developing distribution lists to send emails to a group of people. To prepare the distribution list, the email user may cut and paste names to the distribution list. In a company setting where organizational changes occur often, distribution lists involving people within different organizations of the company may become inaccurate when new people are added to an organization or when people leave an organization.

Maintaining accurate distribution lists is often time consuming and difficult to keep up with, especially in a large corporate setting. Thus, what is needed is a method for providing email addressees that incorporates organization changes in an effective and accurate manner.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearance of the phrases "in one embodiment" and "in an embodiment" appearing in various places throughout the specification are not necessarily all referring to the same embodiment.

Embodiments of the present invention are directed to a method for enabling a user to address an email to a group of recipients by traversing an organization hierarchy structure. This is accomplished using email programs having an embedded organization hierarchy component within the program. By using predefined notations appended to the name of an individual in the addressee field of an email, embodiments of the present invention enable the addressee field of an outgoing email to be re-populated with the individual's manager(s) and/or direct/indirect report(s) accordingly, based on the predefined notation.

Although embodiments of the present invention are described using email programs having an organization hierarchy structure embedded in the program, other types of embedded structures are also applicable. For example, embodiments of the present invention are equally applicable to email programs having a department structure hierarchy, organization unit code structure hierarchy, cost center code structure hierarchy, etc.

As previously indicated, embodiments of the present invention use predefined notations appended to the name of an individual to define who the recipients of an email are to be. Table 1 shows a list of the predefined notations that may be used. The list shown in Table 1 is not meant to limit the types of predefined notations that may be used. One skilled in the relevant art(s) would know that other predefined notations may also be used without departing from the scope of the invention.

TABLE 1

List of Exemplary Predefined Notations

| No. | Predefined Notation | Example Email Usage (Addressee Field) | Definition |
|---|---|---|---|
| 1 | [name]-1 | Kramer, Ken-1 | Email addressed to the direct reports of the named manager |
| 2 | [name]-2 | Kramer, Ken-2 | Email addressed to the indirect reports of the named manager |

TABLE 1-continued

List of Exemplary Predefined Notations

| No. | Predefined Notation | Example Email Usage (Addressee Field) | Definition |
|---|---|---|---|
| | | | (note that a level is skipped) |
| 3 | [name]–N | Davis, Benjamin–N | Email addressed to all the subordinates of the named manager |
| 4 | [name]+1 | Richard, Harrold D+1 | Email addressed to the manager of the named employee |
| 5 | [name]+N | Sails, Tom+N | Email addressed to all of the managers of the named employee |
| 6 | [name]+1–1 | Jones, Avery+1–1 | Email addressed to the peers of the named employee |
| 7 | [name]+1; [name]–1 | Jones, Avery+1; Jones, Avery–1 | Email addressed to the manager of the named employee and to the direct reports of the named employee |

As shown in Table 1, a predefined notation used to obtain one or more email addressees from an organization hierarchy structure includes a special character, such as a "+" sign or a "–" sign, followed by a numeric level indicator. A "+" sign indicates an upper hierarchy (e.g., managers) while a "–" sign indicates a lower hierarchy (e.g., subordinates). The numeric level indicator indicates the level of the manager or the level of the subordinates. The level indicator may include any positive integer (1, 2, 3, . . . , n) to indicate the level of the manager/subordinates or the letter "N" to indicate all managers or all subordinates of the person preceding the predefined notation. The first entry in Table 1, [name]–1, represents the direct reports of [name] or the level 1 reports of [name]. The second entry in Table 1, [name]–2, represents the indirect reports of [name] or the level 2 reports of [name]. The third entry in Table 1, [name]–N, includes all of the direct and indirect reports of [name]. The fourth entry in Table 1, [name]+1, represents the manager of [name] or the first level manager of [name]. The fifth entry in Table 1, [name]+N, represents all of the managers of [name]. The sixth entry in Table 1, [name]+1–1, represents the peers of [name] (with the "+1" indicating the manager of [name] and the "–1" indicating the direct reports of the manager of [name]). The seventh entry in Table 1, "[name]+1; [name]–1", represents the first level manager of [name] and the direct reports of [name]. Thus, the seventh entry in Table 1 implies that more than one entry may be included in the email addressee field that requires more than one traversal of the organization hierarchy structure. In one embodiment, [name] may represent the same person. In another embodiment, each [name] may represent a different person. In yet another embodiment, multiple entries of [name] may represent the same person or different persons.

Figure 1:
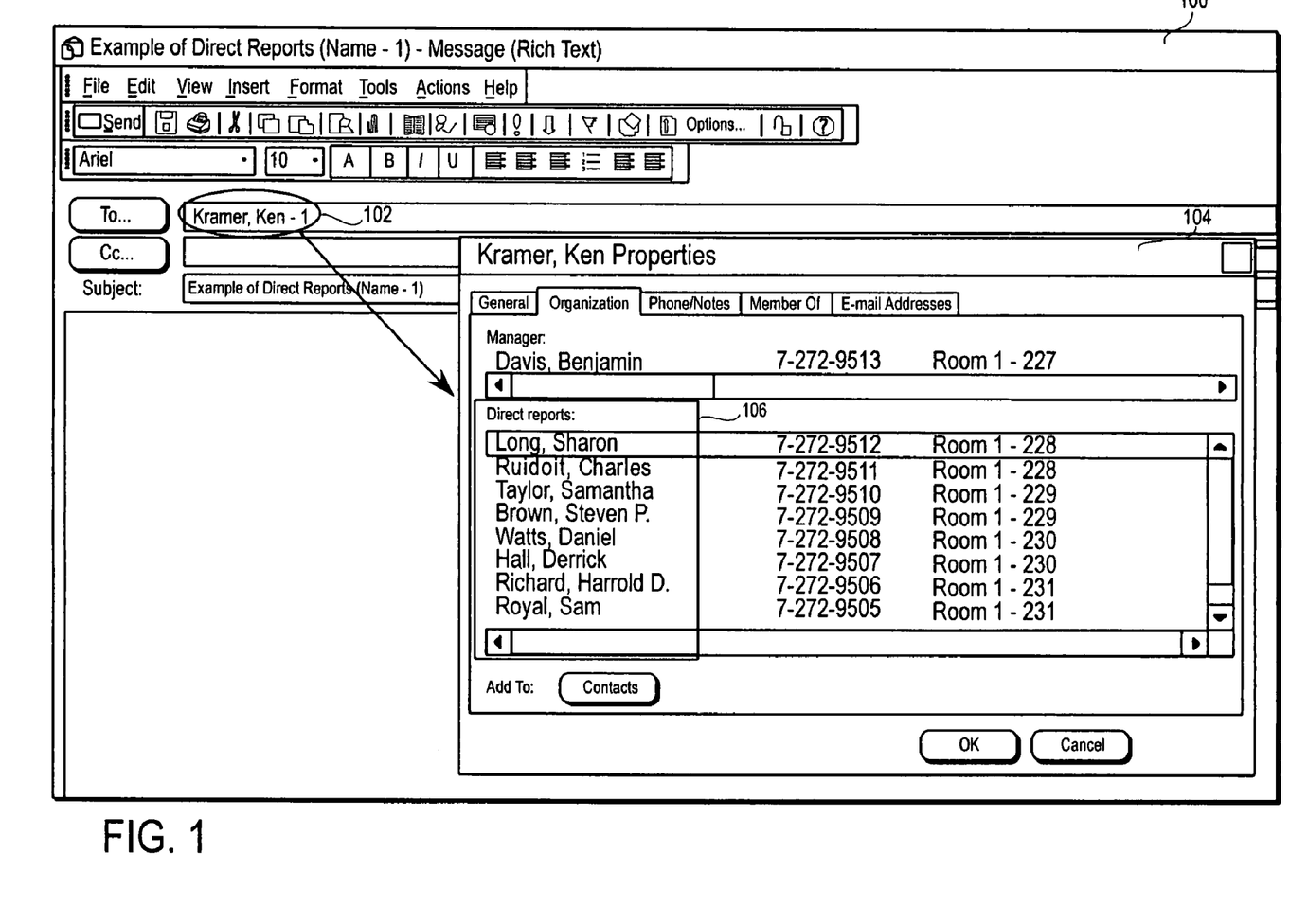
FIG. 1 is a diagram illustrating an exemplary email indicating direct report recipients of an email using an organization hierarchy structure according to an embodiment of the present invention.

FIG. 1 is a diagram illustrating an exemplary email 100 indicating direct report recipients of an email using an organization hierarchy structure according to an embodiment of the present invention. Email 100 shows an addressee field 102 addressed to Kramer,Ken–1. Kramer, Ken represents the [name] and "–1" represents the predefined notation of the entry in addressee field 102. The predefined notation "–1" indicates that the organization hierarchy is to be traversed downward one level according to the organization properties of Kramer, Ken. Thus, email 100 is to be sent to the direct reports of Ken Kramer. Also shown in FIG. 1 are the organization properties 104 for Ken Kramer. Organization properties 104 for Ken Kramer show direct reports 106 of Ken Kramer, who will be the recipients of email 100.

Figure 2:
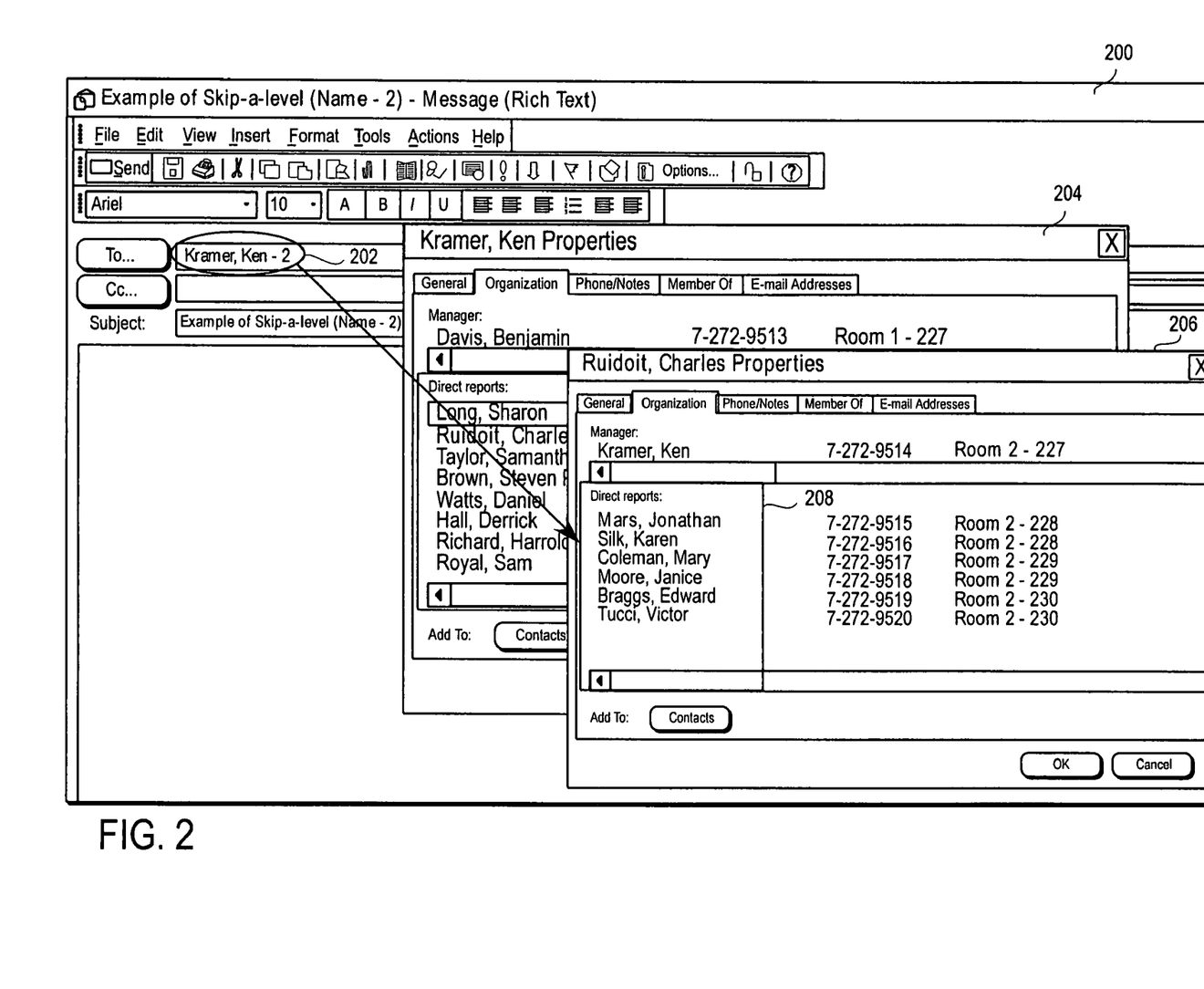
FIG. 2 is a diagram illustrating an exemplary email indicating indirect report recipients of an email using an organization hierarchy structure according to an embodiment of the present invention.

FIG. 2 is a diagram illustrating an exemplary email 200 indicating indirect report recipients of an email using an organization hierarchy structure according to an embodiment of the present invention. Email 200 shows an addressee field 202 addressed to Kramer,Ken–2. Kramer, Ken represents the [name] and "–2" represents the predefined notation of the entry in addressee field 202. The predefined notation "–2" indicates that the organization hierarchy is to be traversed downward two (2) levels according to the organization properties of Kramer, Ken. Thus, email 200 is to be sent to the indirect reports of Ken Kramer. The level two (2) indirect reports of Ken Kramer are the employees that report to Ken Kramer's direct reports. Shown in FIG. 2 is the subordinates list for only one of Ken Kramer's direct reports (i.e., Charles Ruidoit). In reality, each of Ken Kramer's direct reports may have their own subordinates. FIG. 2 shows organization properties 204 for Ken Kramer and organization properties 206 for Charles Ruidoit. Therefore, email 200 will be sent to all of Charles Ruidoit's direct reports 208 (as well as his peer's direct reports, if any), which are Ken Kramer's indirect reports.

Figure 3:
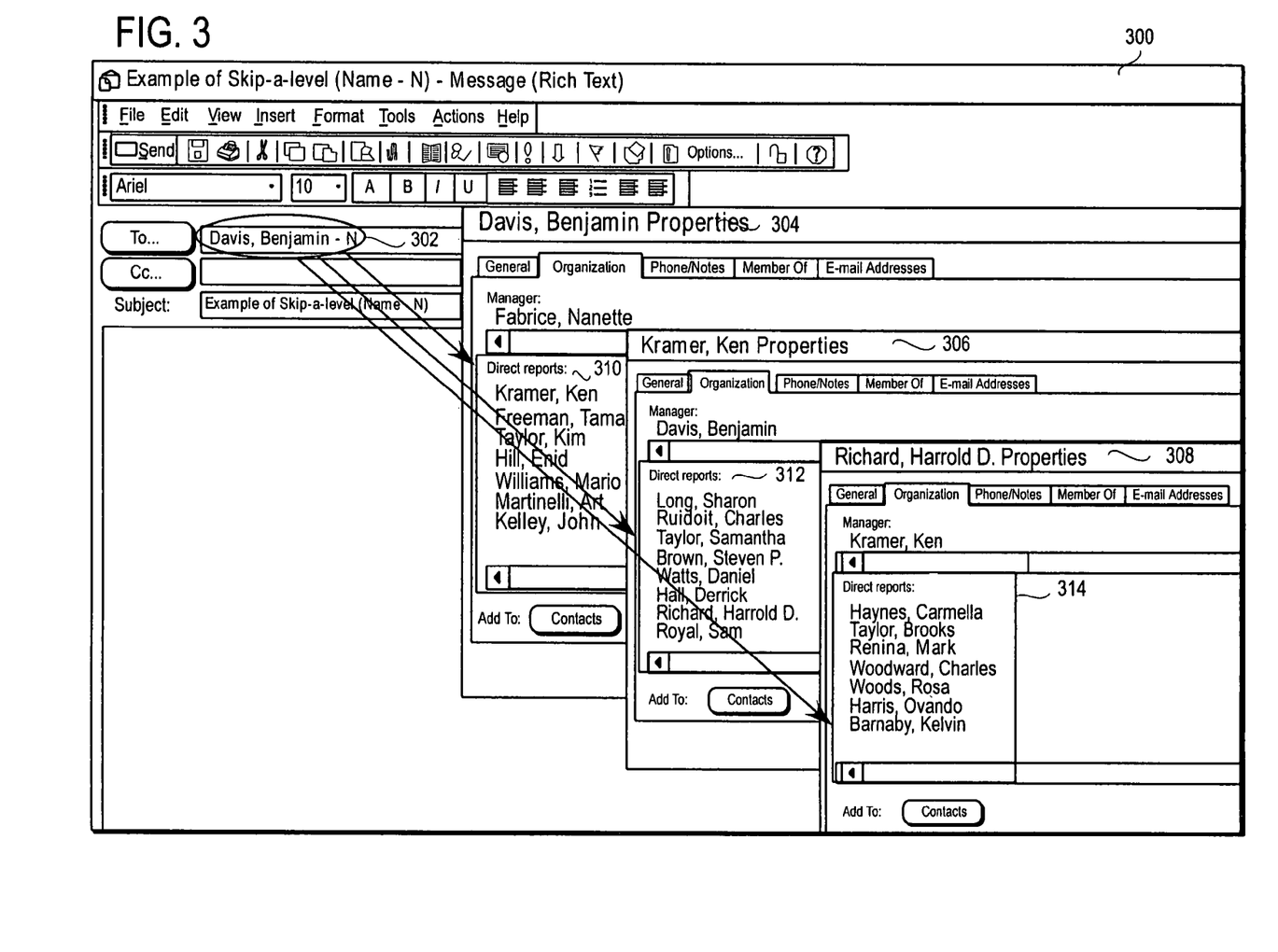
FIG. 3 is a diagram illustrating an exemplary email indicating all subordinates (direct and indirect) of a manager as recipients of an email using an organization hierarchy structure according to an embodiment of the present invention.

FIG. 3 is a diagram illustrating an exemplary email 300 indicating all subordinates of a manager as recipients of an email using an organization hierarchy structure according to an embodiment of the present invention. Email 300 shows an addressee field 302 addressed to Davis,Benjamin–N. Davis, Benjamin represents the [name] and "–N" represents the predefined notation of the entry in addressee field 302. The predefined notation "–N" indicates that the organization hierarchy is to be traversed downward to obtain all subordinates of Benjamin Davis according to the organization properties of Davis, Benjamin. Thus, email 300 is to be sent to all of the subordinates, direct and indirect, of Benjamin Davis. Direct reports 310 report to Benjamin Davis, as shown in Davis, Benjamin Organization Properties 304. Of the direct reports 310 of Benjamin Davis, only Ken Kramer is shown as having direct reports 312, which are shown in Kramer, Ken Organization Properties 306. Of the direct reports 312 of Ken Kramer, only Harrold D. Richard is shown as having direct reports 314, which are shown in Richard, Harrold D. Organization Properties 308. In reality, both Benjamin Davis and Ken Kramer may have other direct reports that manage people as well. Therefore, email 300 may be sent to Benjamin Davis's direct reports 310, Ken Kramer's direct reports 312 (and the direct reports of the peers of Ken Kramer, if any), and Harrold D. Richard's direct reports 314 (and the direct reports of the peers of Harrold D. Richard, if any).

Figure 4:
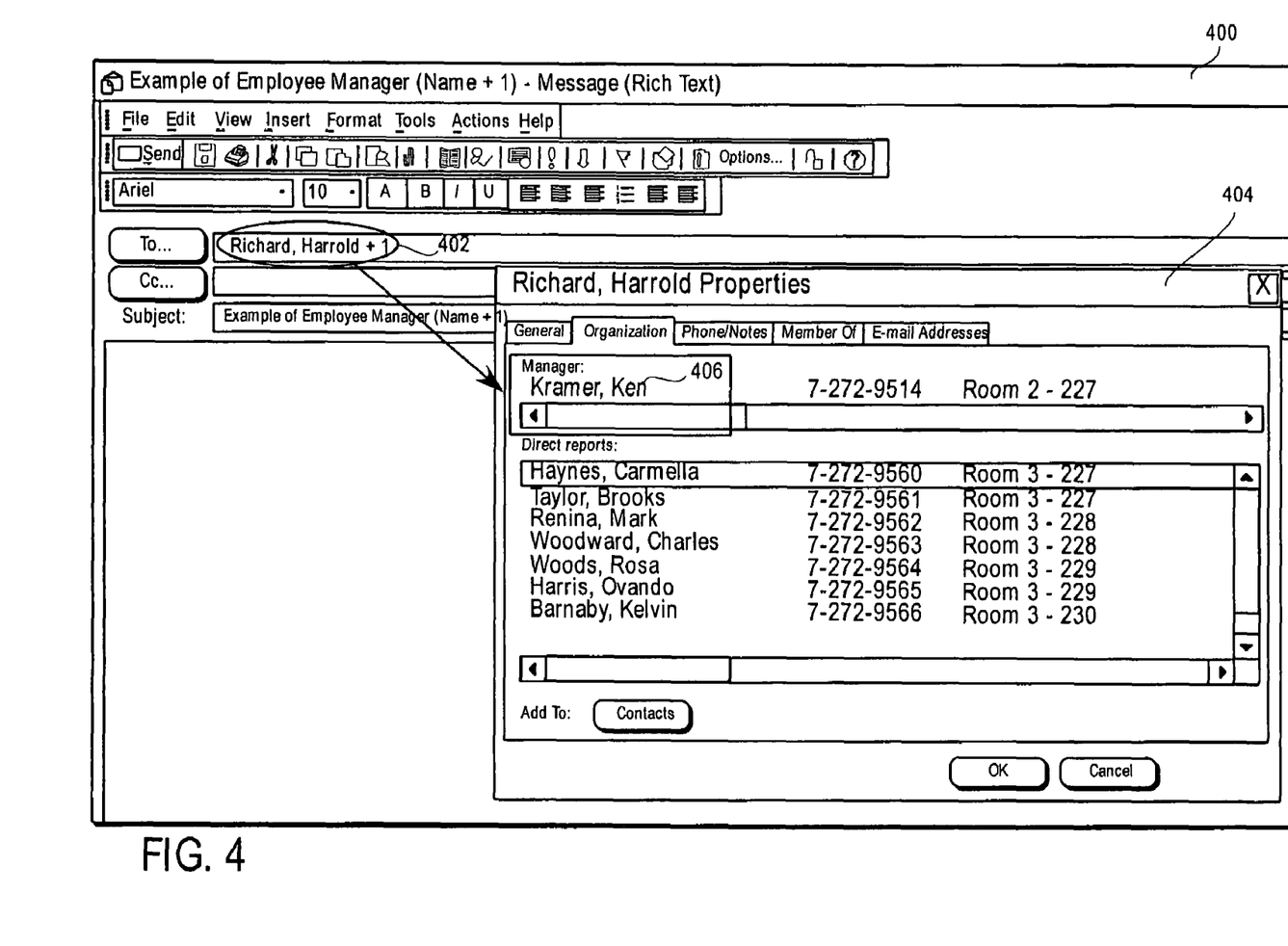
FIG. 4 is a diagram illustrating an exemplary email indicating a manager of an employee as the recipient of an email using an organization hierarchy structure according to an embodiment of the present invention.

FIG. 4 is a diagram illustrating an exemplary email 400 indicating a manager of an employee as the recipient of an email using an organization hierarchy structure according to an embodiment of the present invention. Email 400 shows an addressee field 402 addressed to Richard,HarroldD+1. Richard, Harrold D represents the [name] and "+1" represents the predefined notation of the entry in addressee field 402. The predefined notation "+1" indicates that the organization hierarchy is to be traversed upward one level according to the organization properties of Richard, Harrold D. Thus, email 400 is to be sent to the first level manager of Harrold D. Richard. Also shown in FIG. 4 are organization properties 404 for Harrold D. Richard, indicating Ken Kramer as Harrold D. Richard's manager 406. Therefore, email 400 will be sent to Harrold D. Richard's manager, Ken Kramer.

Figure 5:
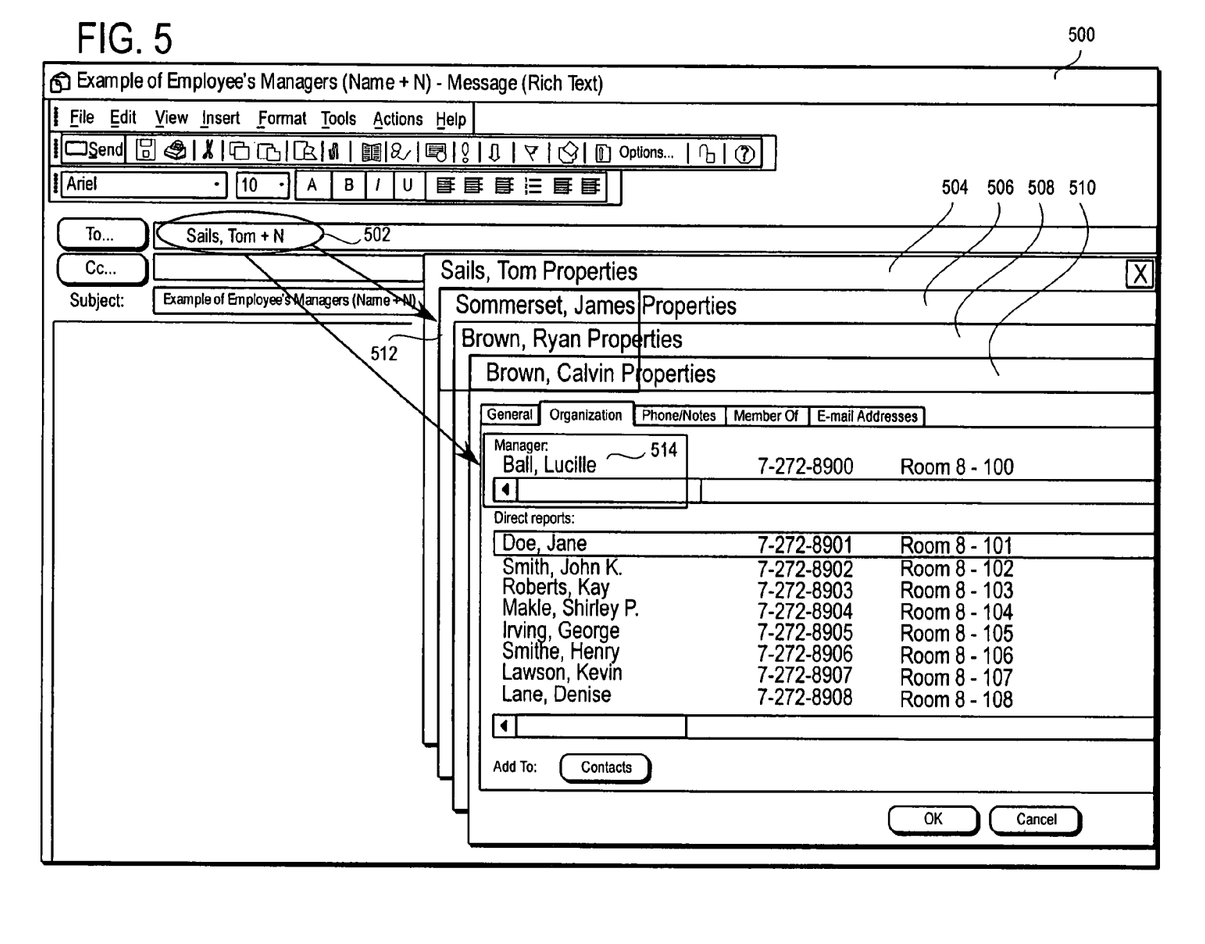
FIG. 5 is a diagram illustrating an exemplary email indicating all managers of an employee as recipients of an email using an organization hierarchy structure according to an embodiment of the present invention.

FIG. 5 is a diagram illustrating an exemplary email 500 indicating all managers of an employee as recipients of an email using an organization hierarchy structure according to an embodiment of the present invention. Email 500 shows an addressee field 502 addressed to Sails,Tom+N. Sails, Tom represents the [name] and "+N" represents the predefined notation of the entry in addressee field 502. The predefined notation "+N" indicates that the organization hierarchy is to be traversed upward to obtain all of the managers of Tom Sails. Thus, email 500 is to be sent to all of the managers of Tom Sails. Also shown in FIG. 5 are the organization properties 504, 506, 508, and 510 for Sails, TOM; Sommerset, James; Brown, Ryan; and Brown, Calvin, respectively. Although not explicitly shown, Sails, Tom organization properties 504 indicate that James Sommerset is Tom Sails's manager. Sommerset, James organization properties 506 indicate that Ryan Brown is James Sommerset's manager. Brown, Ryan organization properties 508 indicate that Calvin Brown is Ryan Brown's manager. Brown, Calvin organization properties 510 indicate that Lucille Ball is Calvin Brown's manager 514. Therefore, email 500 will be sent to managers James Sommerset, Ryan Brown, Calvin Brown, and Lucille Ball.

Figure 6:
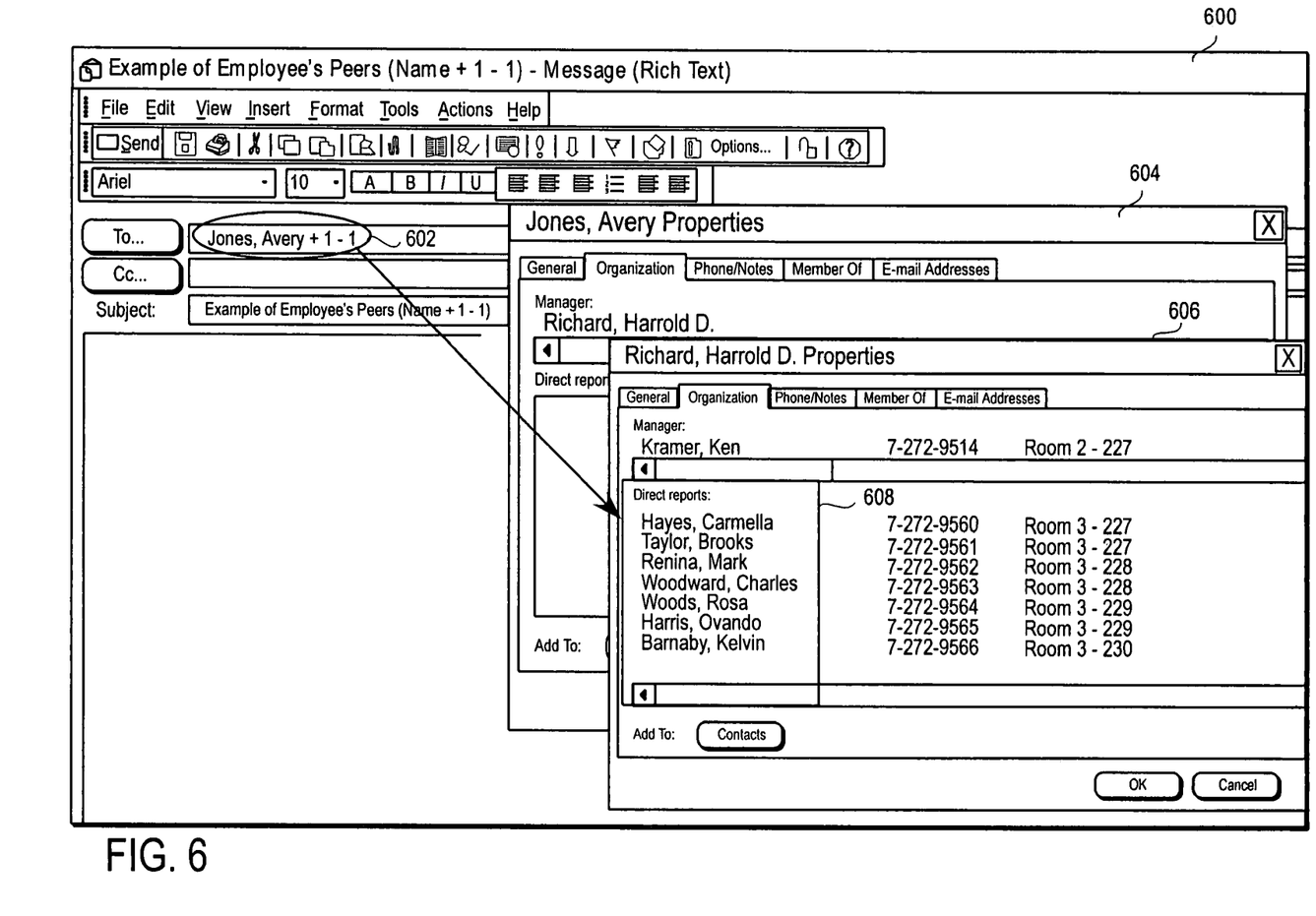
FIG. 6 is a diagram illustrating an exemplary email indicating peers of an employee as recipients of an email using an organization hierarchy structure according to an embodiment of the present invention.

FIG. 6 is a diagram illustrating an exemplary email 600 indicating peers of an employee as recipients of an email using an organization hierarchy structure according to an embodiment of the present invention. Email 600 shows an addressee field 602 addressed to Jones,Avery+1−1. Jones, Avery represents the [name] and "+1−1" represents the predefined notation of the entry in addressee field 602. The predefined notation "+1−1" indicates that the organization hierarchy is to be traversed upward one level to obtain the first level manager of Avery Jones and then traversed downward one level to obtain the direct reports (i.e., first level reports) of Avery Jones's first level manager. Thus, email 600 is to be sent to direct reports 608 of Avery Jones's manager, Harrold D. Richard. Direct reports 608 of Harrold D. Richard are also the peers of Avery Jones. Avery Jones's manager, Harrold D. Richard, is shown in Jones, Avery organization properties 604 and Harrold D. Richard's direct reports 608 are shown in Richard, Harrold D organization properties 606. Therefore, email 600 will be sent to direct reports 608 of Harrold D. Richard.

Figure 7:
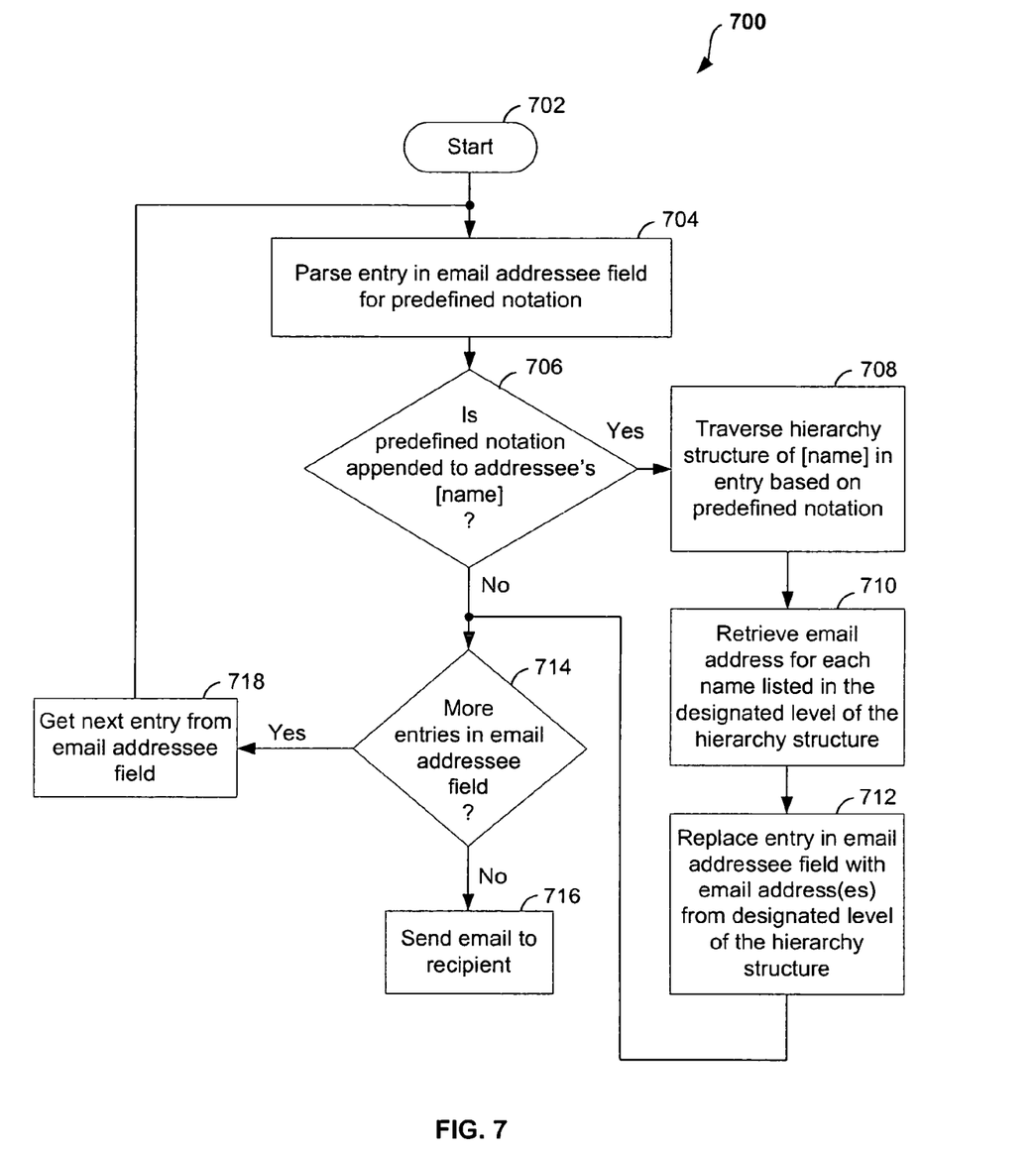
FIG. 7 is a flow diagram illustrating an exemplary method for enabling a user to address an email to a recipient or a group of recipients by traversing an organization hierarchy structure according to an embodiment of the present invention.

FIG. 7 is a flow diagram 700 illustrating an exemplary method for enabling a user to address an email to a recipient or a group of recipients by traversing an organization hierarchy structure according to an embodiment of the present invention. The invention is not limited to the embodiment described herein with respect to flow diagram 700. Rather, it will be apparent to persons skilled in the relevant art(s) after reading the teachings provided herein that other functional flow diagrams are within the scope of the invention. Although flow diagram 700 is described using an organization hierarchy structure, the invention is not limited to an organization hierarchy structure. In fact, one skilled in the relevant art(s) would know that other types of hierarchy structures, such as, for example, a department hierarchy structure, an organization unit code hierarchy structure, and a cost center code hierarchy structure, may also be used. The process begins at 702, where the process immediately proceeds to block 704.

In an embodiment of the invention, an email addressee field may contain one or more email address entries. Each entry in the email addressee field may be handled separately. In block 704, an email address entry from an email addressee field is parsed to determine whether a predefined notation is appended to the email address entry. The email address entry may be parsed after a user of an email program has selected the send button to send an email. The predefined notation includes a special character ("+" or "−" sign) followed by a level indicator, such as, for example, an integer (e.g., "+1") or the letter "N" (e.g., "−N"). Although the predefined notation is indicated as starting with a "+" or a "−" sign, one skilled in the art would know that other special characters may be used to indicate that the email addressee(s) should be obtained from an organization hierarchy structure or some other type of hierarchy structure accessible by the email program. The process then proceeds to decision block 706.

In decision block 706, it is determined whether the predefined notation is appended to the [name] of the email addressee. The predefined notation is determined to be appended to the [name] of the email addressee if a "+" or "−" sign followed by an integer value or the letter "N" is found after a recognized [name] of the email addressee entry. If the predefined notation is appended to the name of the email addressee, then the process proceeds to block 708.

In block 708, the organization properties for the [name] of the email addressee entry are traversed based on the predefined notation. If the special notation begins with a "+", then the organization properties are traversed upward to obtain one or more managers of the [name] in the email addressee entry. If the special notation begins with a "−", then the organization properties are traversed downward to obtain one or more levels of subordinates of the [name] in the email addressee entry.

In block 710, the email address(es) for each email recipient listed in the organization hierarchy structure are retrieved for the level or levels identified in the predefined notation. As previously indicated, the level is indicated by an integer value or the letter "N". The integer value indicates the manager level for a "+" sign or direct or indirect subordinates for a "−" sign. The letter "N" indicates all manager levels for a "+" sign or all direct and indirect reports or subordinates for a "−" sign.

In block 712, the entry in the email address field is replaced with the email address(es) from the designated level of the organization hierarchy structure determined by the predefined notation. The process then proceeds to block 714.

In block 714, it is determined whether additional email address entries are found in the email addressee field. If additional email address entries are found in the email addressee field, then the next entry is retrieved (block 718) and the process proceeds back to block 704 to parse the next email address entry.

Returning to block 714, if it is determined that no additional entries are found in the email addressee field, then the process proceeds to block 716, where the email is sent to the recipient(s) listed in the email addressee field.

Returning to decision block 706, if it is determined that there is no predefined notation appended to the email address entry, then the process proceeds to block 714, where it is determined whether there are additional entries in the email addressee field.

Figure 8A:
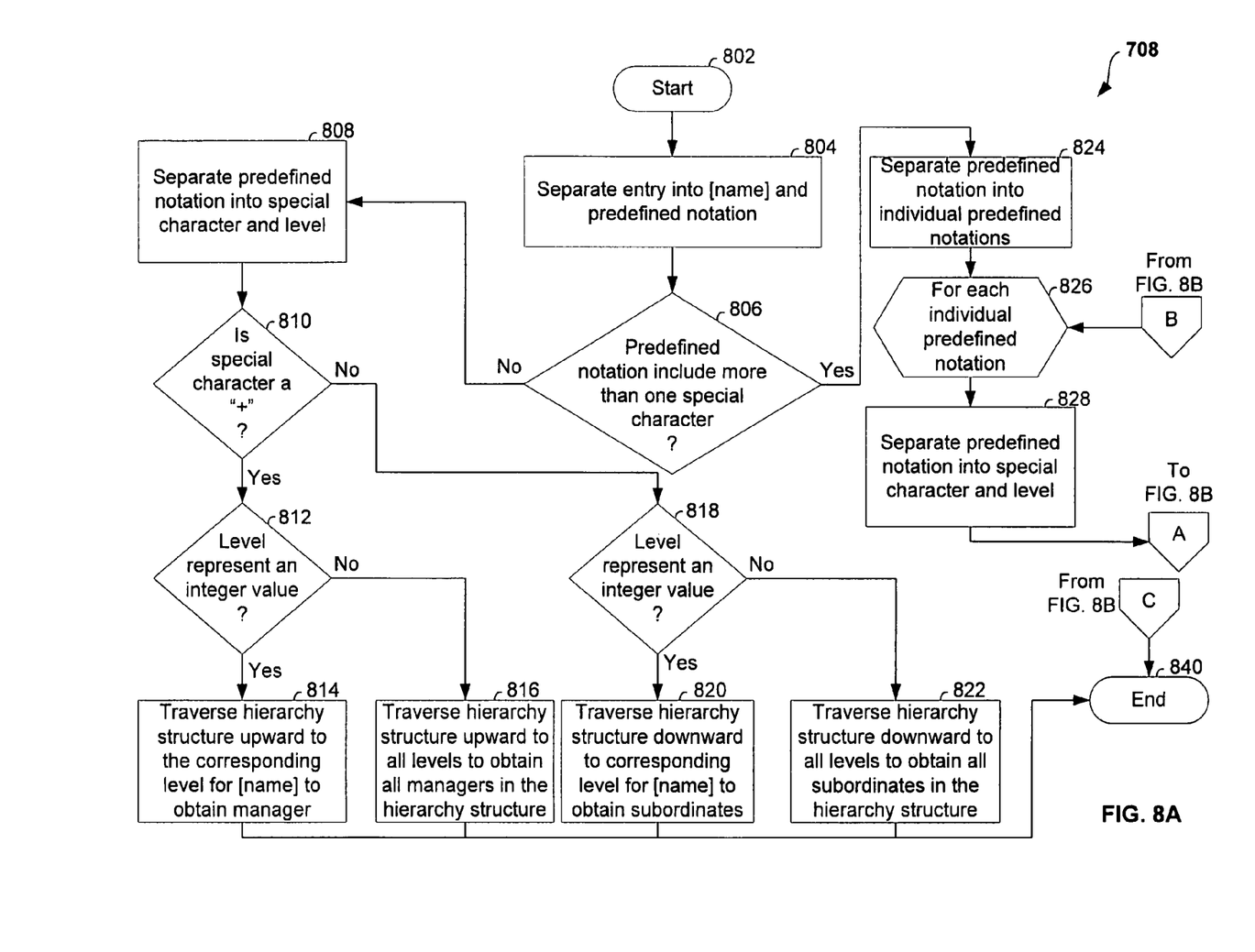
FIGS. 8A and 8B are a flow diagram illustrating an exemplary method for traversing an organization hierarchy structure to retrieve email address(es) designated using a predefined notation according to an embodiment of the present invention.
Figure 8B:
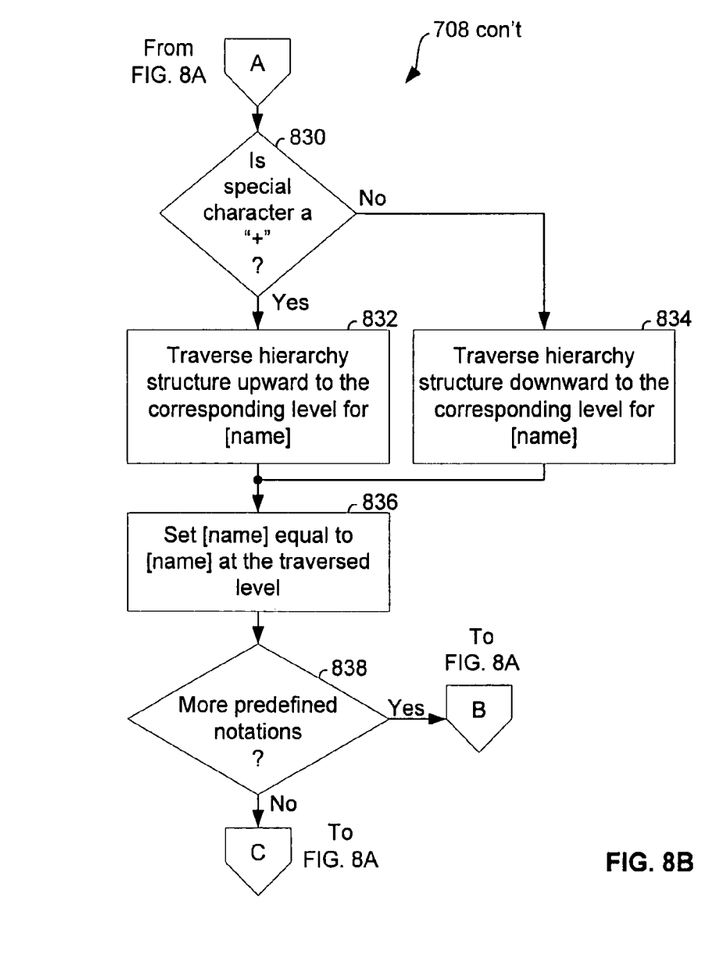

FIGS. 8A and 8B are a flow diagram 708 illustrating an exemplary method for traversing an organization hierarchy structure to retrieve email address(es) designated by predefined notations according to an embodiment of the present invention. The invention is not limited to the embodiment described herein with respect to flow diagram 708. Rather, it will be apparent to persons skilled in the relevant art(s) after reading the teachings provided herein that other functional flow diagrams are within the scope of the invention. As previously indicated, although the present invention is described using an organization hierarchy structure, other types of hierarchy structures are also applicable. The process begins at 802 in FIG. 8A, where the process immediately proceeds to block 804.

In block 804, the entry is separated into the [name] and the predefined notation. The process then proceeds to decision block 806.

In decision block 806, it is determined whether the predefined notation includes multiple predefined notations. Whether there are more than one predefined notations, such as, for example, "+1−1" may be determined by the predefined notation containing more than one special character. If it is determined that the predefined notation does not include multiple predefined notations, the process proceeds to block 808.

In block 808, the predefined notation is separated into the special character and the level indicator. The process then proceeds to decision block 810.

In decision block 810, it is determined whether the special character is a "+" sign. If it is determined that the special character is a "+" sign, then the process proceeds to decision block 812.

In decision block 812, it is determined whether the level indicator represents an integer value. If the level indicator represents an integer value, then the process proceeds to block 814.

In block 814, the hierarchy structure is traversed upward to the corresponding level for [name] to obtain the corresponding level manager. The process then proceeds to block 840, where the process ends.

Returning to decision block 812, if it is determined that the level indicator is not representative of an integer value, then the level indicator is a "N". The process then proceeds to block 816.

In block 816, the hierarchy structure is traversed upward to obtain each manager's name in the hierarchy chain of managers. For example, the hierarchy structure is traversed one level upward to obtain the manager for [name]. Then the hierarchy structure is traversed to the next level manager using the current [manager name]. This continues until all managers in the hierarchy chain have been obtained. The process then proceeds to block 840, where the process ends.

Returning back to decision block 810, if it is determined that the special character is not a "+" sign, then the special character is a "−" sign, and the process proceeds to decision block 818. In decision block 818, it is determined whether the level indicator represents an integer value. If the level indicator represents an integer value, the process proceeds to block 820.

In block 820, the hierarchy structure is traversed downward to the corresponding level for [name] to obtain the subordinates of [name]. The process then proceeds to block 840, where the process ends.

Returning to decision block 818, if it is determined that the level indicator is not representative of an integer value, then the level indicator is represented as "N". The process then proceeds to block 822.

In block 822, the hierarchy structure is traversed downward to obtain all of the subordinates of [name] in the hierarchy chain of subordinates. For example, the hierarchy structure is traversed one level downward to obtain the direct reports for [name]. Then the hierarchy structure is traversed to the next level downward using the name of a direct report that has subordinates. This continues until all subordinates in the hierarchy chain have been obtained. The process then proceeds to block 840, where the process ends.

Returning to decision block 806, if it is determined that the predefined notation includes multiple predefined notations, then the process proceeds to block 824. In block 824, the multiple predefined notations are separated into individual predefined notations.

In block 826, for each individual predefined notation, the process proceeds to block 828, where each individual predefined notation is separated into a special character and a level indicator. The process then proceeds to decision block 830 in FIG. 8B.

In decision block 830, it is determined whether the special character is a "+" sign. If the special character is a "+" sign, then the process proceeds to block 832.

In block 832, the hierarchy structure is traversed upward to the corresponding level indication for [name] to obtain a manager. The process then proceeds to block 836.

In block 836, set [name] equal to the name at the traversed level. The process then proceeds to decision block 838.

In decision block 838, it is determined whether there are more individual predefined notations. If there are more individual predefined notations, the process proceeds back to block 826 in FIG. 8A. If there are no more individual predefined notations, the process proceeds to block 840 in FIG. 8A, where the process ends.

Returning to decision block 830, if it is determined that the special character is not a "+" sign, then the special character is a "−" sign. The process then proceeds to block 834.

In block 834, the hierarchy structure is traversed downward to the corresponding level for [name] to obtain subordinates. The process then proceeds to block 836, which is described above.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A method for email address automation, comprising:
    a) parsing, by a computing device, an entry in an email addressee field the email addressee field entry residing in computer readable memory;
    b) determining, by the computing device, whether the entry includes a predefined notation appended to the entry; and
    c) if the entry has a predefined notation appended to the entry,
        traversing, by the computing device, a hierarchy structure from a name in the entry to a designated level of the hierarchy structure based on the predefined notation;
        retrieving, by the computing device, email addresses of names listed at the designated level; and
        replacing, by the computing device, the entry in the email addressee field with the email addresses retrieved from the designated level of the hierarchy structure;
    wherein the predefined notation defines a relationship between the names at the designated level and the name included in the entry, the predefined notation including a special character indicating if the designated level is a higher or lower level than a level of the name in the entry, and a level indicator indicating a number of levels between the designated level and the level of the name in the entry.

2. The method of claim 1, further comprising sending, by the computing device, an email to all email addresses listed in the email addressee field.

3. The method of claim 1, wherein the traversing comprises traversing the hierarchy structure a certain level upward or downward from the name in the entry based on the special character and the level indicator.

4. The method of claim 3, wherein if the special character is a "+", the hierarchy structure is traversed upward to the level indicated by the level indicator.

5. The method of claim 4, wherein if the hierarchy structure is an organization hierarchy structure, the hierarchy structure is traversed upward to the level indicated by the level indicator to obtain a manager for the name in the entry.

6. The method of claim 4, wherein if the hierarchy structure is an organization hierarchy structure and the level indicator indicates all levels, the hierarchy structure is traversed upward to obtain each manager in the hierarchy chain for the name in the entry.

7. The method of claim 3, wherein if the special character is a "−", the hierarchy structure is traversed downward to the level indicated by the level indicator.

8. The method of claim 7, wherein if the hierarchy structure is an organization hierarchy structure, the hierarchy structure is traversed downward to the level indicated by the level indicator to obtain subordinates for the name in the entry.

9. The method of claim 7, wherein if the hierarchy structure is an organization hierarchy structure and the level indicator indicates all levels, the hierarchy structure is traversed downward to obtain all subordinates in the hierarchy chain for the name in the entry.

10. The method of claim 1, wherein the predefined notation includes a special character of "+" followed by a level indicator, and wherein traversing the hierarchy structure of the name in the entry based on the predefined notation comprises traversing the hierarchy structure upward to a level indicated by the level indicator.

11. The method of claim 1, wherein the predefined notation includes a special character "−" of followed by a level indicator, and wherein traversing the hierarchy structure of the name in the entry based on the predefined notation comprises traversing the hierarchy structure downward to a level indicated by the level indicator.

12. The method of claim 1, wherein the hierarchy structure comprises one of an organization hierarchy structure, a department hierarchy structure, an organization unit code hierarchy structure, or a cost center code hierarchy structure.

13. The method of claim 1, further comprising:
    determining, by the computing device, whether there is another entry in the email addressee field; and
    if there is another entry in the email addressee field, repeating processes a), b), and c).

14. An article comprising: a storage medium having a plurality of machine accessible instructions, wherein when the instructions are executed by a processor, the instructions provide for:
    a) parsing an entry in an email addressee field;
    b) determining whether the entry includes a predefined notation appended to the entry, wherein the predefined notation includes a direction of traversal and a level of traversal; and
    c) if the entry has a predefined notation appended to the entry,
        traversing a hierarchy structure from a name in the entry to a designated level of the hierarchy structure based on the direction and level of traversal indicated in the predefined notation;
        retrieving email addresses of names listed at the designated level; and
        replacing the entry in the email addressee field with the email addresses retrieved from the designated level of the hierarchy structure;
    wherein the predefined notation defines a relationship between the names at the designated level and the name included in the entry, the predefined notation including a special character indicating if the designated level is a higher or lower level than a level of the name in the entry, and a level indicator indicating a number of levels between the designated level and the level of the name in the entry.

15. The article of claim 14, further comprising instructions for:
- determining whether there is another entry in the email addressee field; and
- if there is another entry in the email addressee field, repeating the instructions for a), b), and c).

16. The article of claim 14, further comprising instructions for sending an email to all email addresses listed in the email addressee field.

17. The article of claim 14, wherein instructions for traversing comprises instructions for traversing the hierarchy structure a certain level upward or downward from the name in the entry based on the special character and the level indicator.

18. The article of claim 17, wherein if the special character is a "+", instructions for traversing the hierarchy structure of the name in the entry based on the predefined notation include instructions for traversing the hierarchy structure upward to the level indicated by the level indicator.

19. The article of claim 17, wherein if the hierarchy structure is an organization hierarchy structure and the special character is a "+", instructions for traversing the hierarchy structure of the name in the entry based on the predefined notation include instructions for traversing the hierarchy structure upward to the level indicated by the level indicator to obtain a manager for the name in the entry.

20. The article of claim 17, wherein if the hierarchy structure is an organization hierarchy structure and the special character is a "+" and the level indicator indicates all levels, instructions for traversing the hierarchy structure of the name in the entry based on the predefined notation include instructions for traversing the hierarchy structure upward to obtain each manager in the hierarchy chain for the name in the entry.

21. The article of claim 17, wherein if the special character is a "−", instructions for traversing the hierarchy structure of the name in the entry based on the predefined notation include instructions for traversing the hierarchy structure downward to the level indicated by the level indicator.

22. The article of claim 17, wherein if the hierarchy structure is an organization hierarchy structure and the special character is a "−", instructions for traversing the hierarchy structure of the name in the entry based on the predefined notation include instructions for traversing the hierarchy structure downward to the level indicated by the level indicator to obtain subordinates for the name in the entry.

23. The article of claim 17, wherein if the hierarchy structure is an organization hierarchy structure and the special character is a "−" and the level indicator indicates all levels, instructions for traversing the hierarchy structure of the name in the entry based on the predefined notation include instructions for traversing the hierarchy structure downward to obtain all subordinates in the hierarchy chain for the name in the entry.

24. The article of claim 14, wherein the hierarchy structure comprises one of an organization hierarchy structure, a department hierarchy structure, an organization unit code hierarchy structure, or a cost center code hierarchy structure.

\* \* \* \* \*

UNITED STATES PATENT AND TRADEMARK OFFICE
CERTIFICATE OF CORRECTION

PATENT NO. : 7,613,732 B2
APPLICATION NO. : 11/128695
DATED : November 3, 2009
INVENTOR(S) : Haw Kuang Oh Page 1 of 1

It is certified that error appears in the above-identified patent and that said Letters Patent is hereby corrected as shown below:

In the Claims

Column 10

Line 25, "includes a special character "-" of followed by a level..." should read -- includes a special character of "-" followed by a level... --.

Signed and Sealed this
Tenth Day of September, 2013

Teresa Stanek Rea
*Acting Director of the United States Patent and Trademark Office*